Nov. 21, 1933.         G. V. TURNBULL         1,936,416
RECORDING DEVICE
Filed Feb. 8, 1932         3 Sheets-Sheet 1
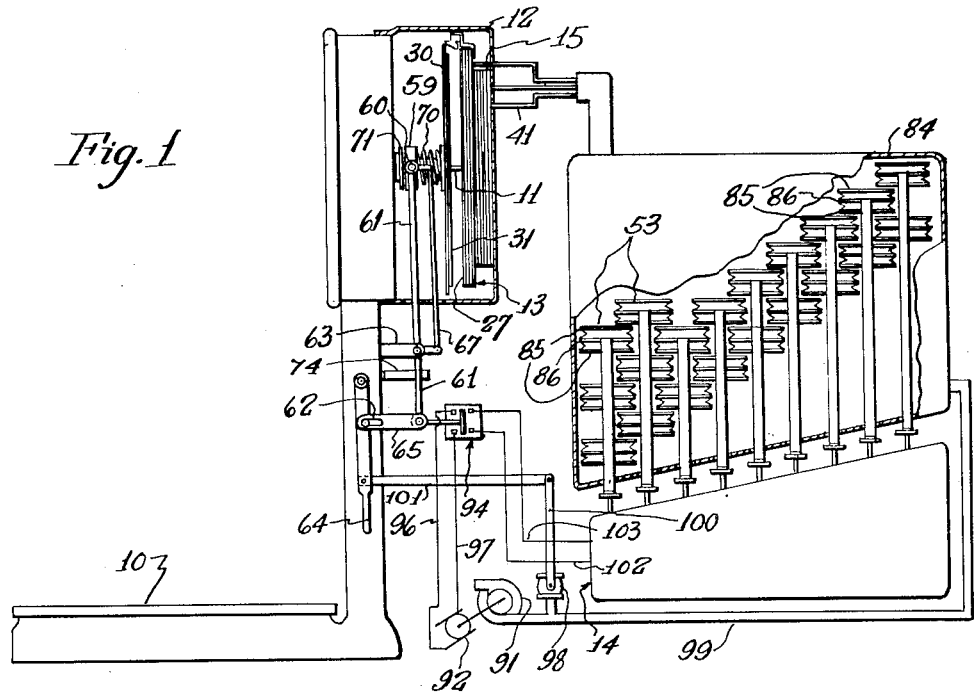
Fig. 1
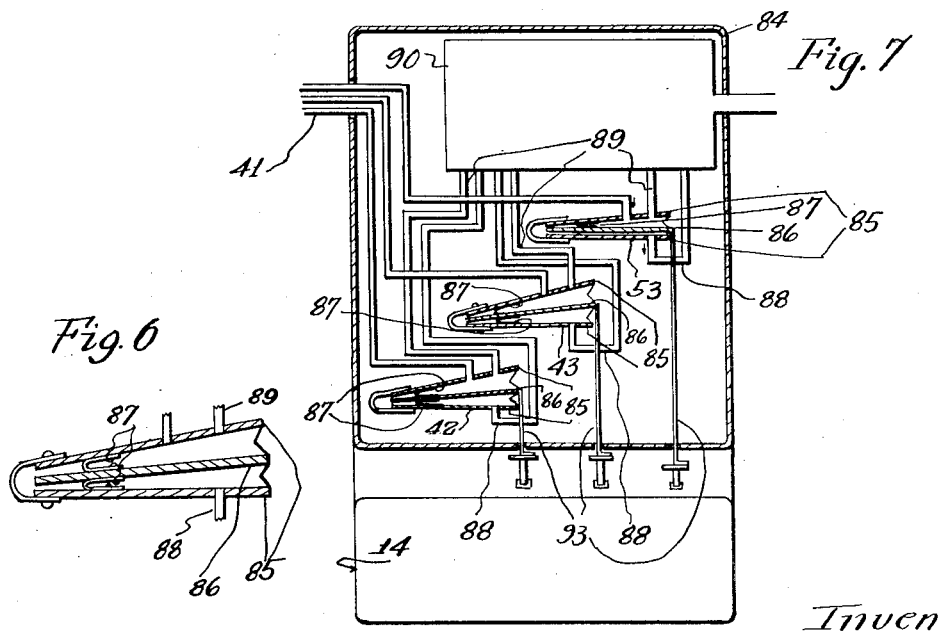
Fig. 6
Fig. 7
Inventor
George V. Turnbull
Charles M. Lindrooth
Attorney Nov. 21, 1933.  G. V. TURNBULL  1,936,416
RECORDING DEVICE
Filed Feb. 8, 1932   3 Sheets-Sheet 2
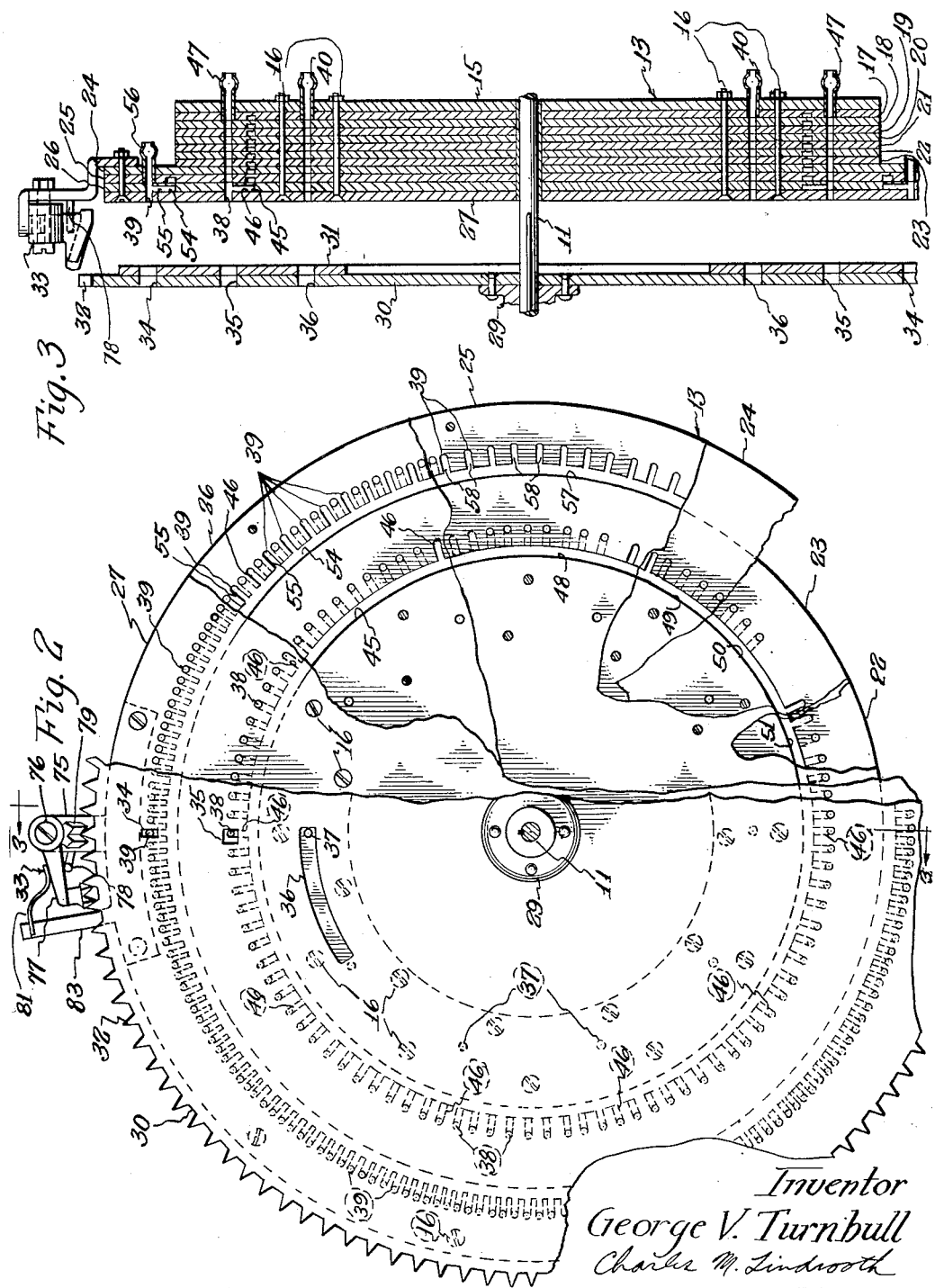
Inventor
George V. Turnbull
Charles M. Lindrooth
Attorney Nov. 21, 1933.  G. V. TURNBULL  1,936,416
RECORDING DEVICE
Filed Feb. 8, 1932   3 Sheets-Sheet 3
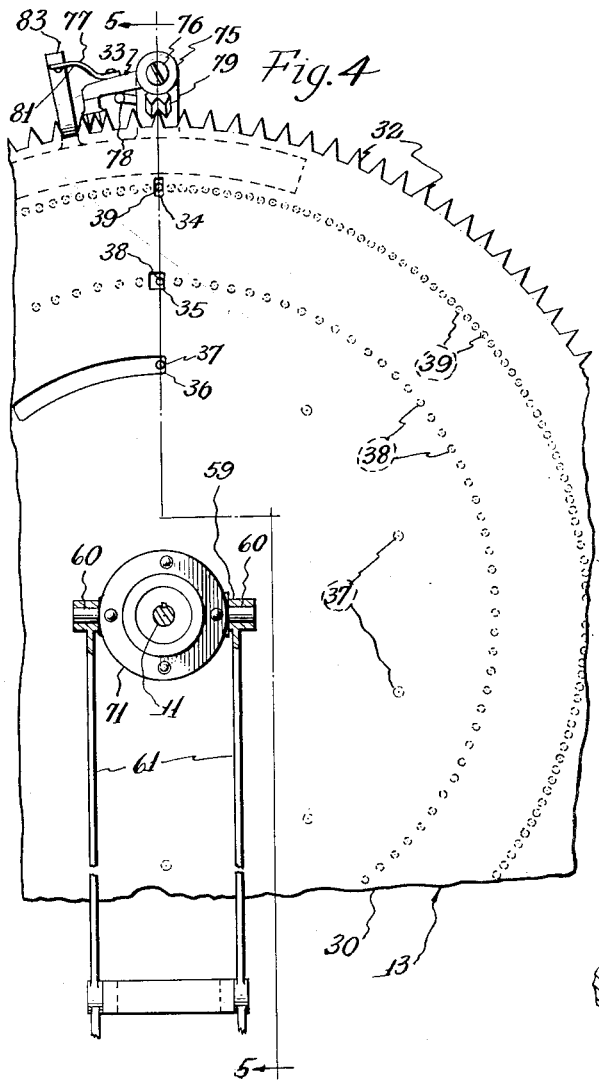
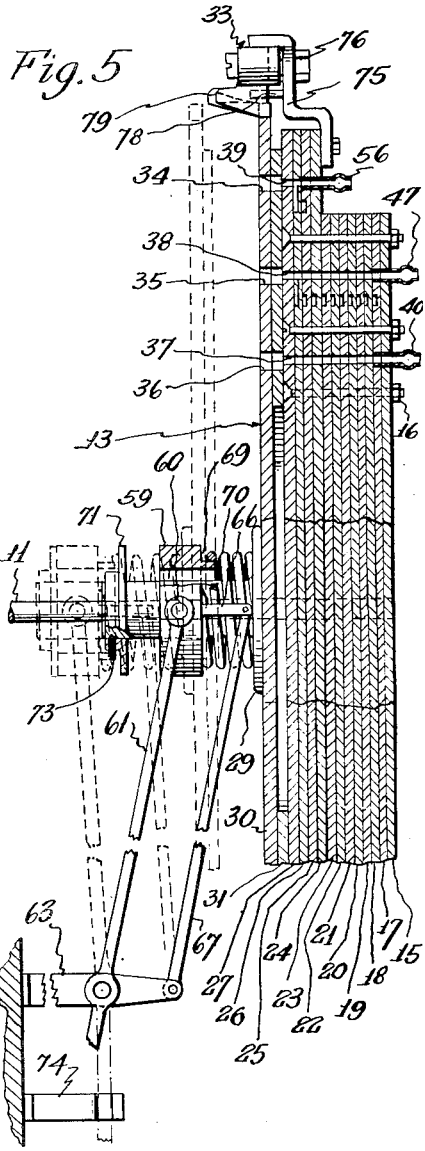
Inventor
George V. Turnbull
Charles M. Lindrooth
Attorney Patented Nov. 21, 1933

1,936,416

UNITED STATES PATENT OFFICE 1,936,416

RECORDING DEVICE

George V. Turnbull, Chicago, Ill.

Application February 8, 1932. Serial No. 591,617

20 Claims. (Cl. 235—58)

This invention relates to improvements in recording devices and has among other objects to provide a new and improved means of a simplified construction particularly adapted for use with scales for operating suitable registering mechanism remote from the scale wherein the weights measured may be recorded and totaled.

Various means for recording and totaling weights measured have been provided for use with scales. These means have been of a complicated construction requiring a complicated system of levers and electrical connections which necessarily causes a drag on the weighing mechanism and inaccuracies in the weights measured and recorded. In carrying out my invention I have eliminated all complicated mechanisms on the scale dial shaft or weighing mechanism and have provided a simplified means for operating suitable recording and totaling mechanism remote from the scale itself wherein the power for operating the recording and totaling mechanism is derived from sources other than the weighing mechanism itself.

Other objects of my invention will appear from time to time in the following specification.

My invention may be more clearly understood with reference to the accompanying drawings wherein:

Figure 1 is a partial diagrammatic view showing the device of my invention applied to a scale and recording apparatus;

Figure 2 is an enlarged fragmentary front elevation of a portion of the device of my invention with parts broken away to more clearly show the details thereof;

Figure 3 is a sectional view taken on line 3—3 of Figure 2;

Figure 4 is an enlarged partial fragmentary front elevation of a portion of the device of my invention showing different parts and details than are shown in Figure 1;

Figure 5 is a sectional view taken on line 5—5 of Figure 4;

Figure 6 is an enlarged view taken through one of the bellows showing the details thereof; and Figure 7 is an enlarged diagrammatic view showing details of the method of operating the recording and totaling mechanism.

Like numerals refer to like parts throughout the various figures.

Referring now to the embodiment of my invention as illustrated in the drawings, 10 indicates a scale of an ordinary type, the details of which will not herein be shown since they are no part of my invention. The scale 10 may be of any type well known to those familiar with the art but is herein preferably shown as being a scale wherein the weights measured are indicated by a dial in an ordinary manner. As herein shown the scale 10 is provided with a dial shaft 11 which extends rearwardly therefrom and has a part of the device of my invention arranged coaxially therewith, although it is obvious that the device of my invention may be arranged in any other manner with respect to said dial shaft.

Extending rearwardly from the drum of the scale 10 is a support member 12. This support member is cylindrical in shape and has a closed rearward end for supporting a selector unit generally indicated at 13. The selector unit 13 in general provides a means for selectively operating a recording and totaling device diagrammatically indicated at 14, by means of air or fluid pressure during the weighing operation when the scale dial shaft 11 is at rest, indicating the weight to be recorded.

Referring now in particular to the details of the selector unit 13 as shown in Figures 2 to 5, inclusive, and several of the novel features of my invention, an apertured plate 15 is supported by the support member 12 on the inner or rearward side thereof rearwardly of the rearward side of the scale dial in an ordinary manner independently of but concentric with the dial shaft 11. The apertured plate 15 has a plurality of successively arranged apertured plates extending inwardly therefrom towards the rearward side of the scale dial, abutting each other and secured to said apertured plate 15 by any suitable means such as nuts and bolts 16, said apertured plates being designated by reference characters 17, 18, 19, 20, 21, 22, 23, 24, 25, 26 and 27, respectively. These last mentioned apertured plates are also concentric with the dial shaft 11 and together with the plate 15 are herein preferably shown as forming a bearing support for said dial shaft, although it may readily be understood that any other bearing support for the dial shaft 11 may be provided. The apertured plate 27 will hereinafter be referred to as the master plate.

Feathered on the dial shaft 11 rearwardly of the scale 10 and forwardly of the master plate 27 is a flanged hub 29 having a selector plate 30 supported thereon in a usual manner. While it is herein stated that the selector plate 30 is feathered on the dial shaft 11 rearwardly of the scale 10 it may be understood that said selector plate may be connected with any other means having connection with the weighing mechanism or with another shaft, or other mechanism having operative connection with the dial shaft 11 if desired.

The selector plate 30 is adapted to engage the master plate 27 for operating the recording and totaling apparatus 14 when the scale dial shaft 11 has come to rest indicating the correct weight measured. It should be herein noted that the recording and totaling device 14 is operated by closing certain apertures in the master plate 27 and allowing certain other apertures to remain open, all of which apertures lead to suitable suction mechanism for operating the recording and totaling device 14 in a manner which will hereinafter be more fully explained. In order to effect closing of the desired apertures in the master plate 27, an annular ring 31 is secured to the inner periphery of the selector plate 30 and is adapted to engage the master plate 27 and form an air tight connection between said plates except where it is desired that suction be released from certain predetermined apertures. The annular ring 31 may be made of any desired resilient material which will effectively close the desired apertures in the apertured master plate 27 such as rubber or any other suitable material.

The selector plate 30 has a plurality of V shaped teeth 32 along its entire outer periphery adapted to be engaged by a dog generally indicated at 33 for centering the selector plate 30 and holding it from rotary movement when it is being moved to engage the master plate 27 during the recording operation in a manner which will hereinafter be more fully explained.

The selector plate 30 is provided with an aperture 34 near its outer edge which will hereinafter be termed a units aperture, a wider aperture 35 spaced closer to the center of said selector plate which will hereinafter be termed a tens aperture, and an arcuate shaped slot 36 spaced from said aperture 35 closer to the center of said selector plate. This last mentioned slot will hereinafter be termed the hundreds slot or aperture. It should be noted that in the form shown the right hand edges of the apertures 34 and 35 and the slot 36 are substantially in alignment with each other and that the length of said apertures progressively increase from the aperture 34. It may however be understood that said apertures may be arranged in other related positions on the selector plate 30 if desired.

The master plate 27 is provided with apertures corresponding with the apertures 34, 35 and 36 in the selector plate 30 which herein comprise a series of spaced apertures 37, 38 and 39. The apertures 37 are spaced on the same radius as the arcuate shaped slot 36 and adapted to selectively register with said arcuate shaped slot. These apertures will hereinafter be referred to as hundreds apertures since opening of any one of these apertures at the proper time is adapted to cause operation of one of the hundreds keys on the recording and totaling device 14. It should herein be noted that the length of the hundreds slot, or aperture 36, is substanitally equal to the distance from one side of one hundreds aperture 37 to the same side of the next hundreds aperture 37 so said slot will register with one hundreds aperture while the tens aperture 35 registers with any one tens aperture from "zero" to "nine".

The spaced apertures 38 are on the same radius as the aperture 35 in the selector plate 30 and are adapted to selectively register with said aperture. These apertures are spaced closer together than the apertures 37 and will hereinafter be referred to as tens apertures since opening of any one of these apertures at the proper time is adapted to cause operation of one of the tens keys on the recording and totaling device 14.

Likewise, the spaced apertures 39 are on the same radius as the units aperture 34 in the selector plate 30. These apertures are spaced closer together than the apertures 38 and are adapted to selectively register with the aperture 34 and will hereinafter be referred to as units apertures.

The hundreds apertures 37 extend through the plates 27, 26, 25, 24, 23, 22, 21, 20, 19, 18, 17 and 15 respectively, and each have a nipple 40 secured therein. Each nipple 40 is adapted to have a flexible tube 41 connected thereto and each tube is adapted to be connected to a bellows 42, each of which bellows is operatively connected to a hundreds key on the recording and totaling device 14 for operating said key and said recording and totaling device in a manner which will hereinafter be more fully described. In the form shown there are ten hundreds apertures 37. Thus one hundreds aperture 37 is adapted to cause operation of the "one hundred" key on the recording and totaling device 14, the next hundreds aperture is adapted to cause operation of the "two hundred" key on the recording and totaling device 14, etc.

The tens apertures are spaced so there are nine tens apertures between each set of hundreds apertures; as, for instance, when the selector plate 30 is in the position shown in Figure 2 the arcuate shaped slot 35 registers with the "zero" hundreds aperture, the aperture 34 registers with the "zero" tens aperture and the aperture 33 registers with the "zero" units aperture. When the selector plate 30 is moved in a clockwise direction by the dial shaft 11 and said dial shaft is at rest and said selector plate is engaged with the master plate 27 all of the tens apertures excepting one are closed and all of the units apertures are closed excepting the units aperture registering "zero" or "five".

It should herein be noted that in the form shown there are only two sets of units apertures; namely, those which register "zero" and those which register "five". It may be understood, however, that any number or arrangement of units apertures may be provided depending upon the accuracy or range desired. By an increase in diameter of the master plate 27 and its associated plates and a corresponding increase in diameter of the selector plate 30, any number of units apertures may be provided. Also it may be readily understood that by a decrease in the number of hundreds and tens apertures and corresponding increase in distance between said apertures, units apertures from "one" to "ten" may be provided. It also may be understood that the hundreds apertures may be used to register units, the tens apertures to register tenths, and the units apertures to register hundredths if desired.

Each of the tens apertures 38 is adapted to have connection with a bellows 43 by means of suitable flexible tubing, each bellows being adapted to operate a tens key on the recording and totaling device 14. In order to minimize the number of tubes used, means are provided to connect each similar tens aperture 38 together. By this means each "zero" tens aperture may be connected together so one flexible tube will connect all the "zero" tens apertures to one associated bellows, and so one flexible tube will connect all the "one" tens apertures to one associated bellows, etc.; as, for instance, the "zero" tens apertures 38 are connected together by a circular channel 45 in the apertured plate 26. A duct 46 leads from each "zero" aperture 38 to this channel and one "zero" tens aperture 38 extends through the apertured plates 26, 25, 24, 23, 22, 21, 20, 19, 18, 17 and 15, respectively, and has a nipple 47 secured therein, which nipple serves to connect all the "zero" tens apertures 38 with the "zero" tens bellows 43 by means of a suitable flexible tubing in an obvious manner.

Likewise, a channel 48 in the apertured plate 25 connects all the "one" tens apertures 38 together; a channel 49 in the apertured plate 24 connects all the "two" tens apertures 38 together; a channel 50 in the apertured plate 23 connects all "three" tens apertures 38 together; a channel 51 in the apertured plate 22 connects the "four" tens apertures 38 together. In a similar manner a channel is provided in each respective plate 21, 20, 19, 18 and 17 to connect all "five", "six", "seven", "eight" and "nine" tens apertures 38 together.

Each of the units apertures 39 is adapted to have connection with a bellows 53 by means of suitable flexible tubing, each bellows being adapted to operate a units key on the recording and totaling device 14. A circular channel 54 is provided for connecting all "zero" units apertures 39 together. This channel has ducts 55 leading to each "zero" units aperture 39 and one "zero" units aperture 39 extends through the apertured plates 26, 25 and 24 and has a nipple 56 secured thereto. Suitable tubing is provided to connect the nipple 56 and the "zero" units apertures with a "zero" units bellows 53 which has operative connection with the "zero" units key on the recording and totaling device 14. In a similar manner all of the "five" units apertures are connected together by a circular channel 57 and ducts 58 lead therefrom to each "five" units aperture and are connected with a "five" units bellows 53 which is adapted to operate the "five" units key on the recording and totaling device 14.

Means are provided to move the selector plate 30 along the dial shaft 11 to engage the annular ring 31 with the master plate 27 and close all the apertures in said master plate with the exception of the ones opened by the arcuate shaped slot 36 and the apertures 35 and 34. Any suitable means may be used; as, for instance, suitable automatic mechanisms may be provided for moving the selector plate 30 along the dial shaft 11 to engage the annular ring 31 with the master plate 27, but in the form shown, I herein preferably employ manually operated means for moving said selector plate along the dial shaft 11. In looking at Figures 1, 4, and 5, it may be seen that said shifting means comprises a collar 59 which surrounds but is supported independently of the hub 29 so as to have no engagement with said hub.

A pin 60 extends horizontally outwardly from each side of the collar 59. A bifurcated shifting lever 61 has connection with the pins 60. This shifting lever 61 extends downwardly under collar 59 and is pivotally supported intermediate its ends on a support member 63 fixed to the scale 10 in a suitable manner. A link 65 connects a hand lever 64 pivotally connected to the scale 10 in a suitable manner with the shifting lever 61 so movement of said hand lever will cause movement of said shifting lever.

The link 65 is provided with a slot 62 therein at its point of connection to the hand lever 64 so that said hand lever may move a certain distance when it is desired to disengage the selector plate 30 from the master plate 27 before disengaging said plates to permit the actuation of certain mechanism connected with the recording and totaling mechanism, which will hereinafter be more fully described, before disengagement of the selector plate 30 from the master plate 27.

A member 66 extends from each side of the collar 59 towards the selector plate 30. Each of these members has a link 67 pivotally connected thereto and extending downwardly therefrom. The opposite ends of the links 67 are pivotally supported on extensions from the support member 63 so as to be parallel with the shifting lever 61. It may thus be seen that movement of the shifting lever 61 moves the collar 59 along the hub 29 of the selector plate 30 in a path substantially parallel with said hub and the links 67 and member 66 hold said collar parallel to said hub and prevent said collar from engaging said hub, thus eliminating the tendency for said collar to cause a drag on the weighing mechanism.

A shoulder 69 is provided on the end of the collar 59 facing the selector plate 30. A compression spring 70 is adapted to be fixed on said shoulder at one end and have contact with the flange of the hub 29 at its other end. Thus upon movement of the collar 59 towards the master plate 27 the selector plate 30 will be moved towards said master plate by means of the compression spring 70, and the annular ring 31 will be engaged with said master plate.

The function of the compression spring 70 is to form a means for engaging the annular ring 31 on the selector plate with the master plate 27 upon movement of the hand lever 64 and collar 59 so that when the annular ring 31 engages the master plate 27 and closes the desired apertures therein the hand lever 64 may be moved further in the same direction to throw a suitable suction device into operation to effect suction in the bellows 42, 43 and 53 in a manner which will hereinafter be more fully explained.

A collar 71 is secured to the opposite end of the hub 29 by means of a suitable set screw 73 so that upon movement of the collar 59 away from the selector plate 30, said collar will engage the collar 71 and disengage said selector plate and the annular ring 31 from the master plate 27.

In Figure 5 it may be seen that when the annular ring 31 is engaged with the master plate 27 that a certain amount of clearance is provided between the end of the collar 59 and the collar 71, which clearance is more than would be ordinarily obtained by compression of the spring 70 by means of the shifting lever 61 and hand lever 64. The function of this excessive clearance between the collar 59 and collar 71 is to permit said collars to be disengaged from each other during the weighing operation and thus cut down all unnecessary frictional resistance between said collars and the weighing mechanism itself. Means are provided to hold the collar 59 in a disengaged position from the collar 71 which may be of any suitable construction which herein comprises a notched spring member 74 having connection with the scale 10 and having a notched portion engageable with the shifting lever 61. Thus when the selector plate 30 is disengaged from the master plate 27 said selector plate must be moved to an extreme disengaged position as is shown by dotted lines in Figure 5. The collar 59 must then be moved towards the selector plate 30 until the collar 59 is disengaged from the collar 71 and the shifting lever 61 drops into the notch provided in the notched spring member 74 for holding the collar 59 in a neutral position disengaged from the collar 71 as is illustrated in Figure 1.

It may thus be seen that a relatively simple shifting means has been provided for engaging the annular ring 31 with the master plate 27, which shifting means is supported free from the dial shaft 11 and selector plate 30, so arranged as not to cause any drag on said dial shaft.

Referring now in particular to the centering dog indicated at 33, said dog is provided for the purpose of centering and aligning the apertures 36, 35, and 34 with the respective apertures 37, 38, and 39 so said first mentioned apertures will not straddle any of the last mentioned apertures and to cause the selector plate 30 to move into its proper position when being engaged with the master plate 27. While the centering dog 33 may be of any desired form, as herein shown said dog is shaped so as to engage the groove between any two of the teeth 32 or the top portion of any one of said teeth. The teeth 32 are equally spaced and arranged so there are half as many teeth as units apertures so one units aperture will be centered in a space between two teeth 32 and the next will be centered with a tooth 32.

A member 75 is secured to the apertured plate 24 and extends upwardly and forwardly therefrom overhanging the master plate 27. Said member serves to pivotally support the centering dog 33 by a suitable means; as, for instance, a nut and bolt 76.

The centering dog 33 includes a centering portion 77 which extends outwardly and forwardly therefrom so its forward end clears the teeth 32 of the selector plate 30 when said selector plate is disengaged from the master plate 27 and the operating handle 64 is in a neutral position. The centering portion 77 is shaped so its lower portion is in the form of the letter W equal in width to the space between any two teeth 32 for engaging the space between any two of the teeth 32 and having its central portion of sufficient dimensions to engage the top of any tooth 32. The forward sides of the centering portion 77 of the centering dog 33 are pointed so the centering portion 77 may readily register with any tooth 32 or space between any two teeth 32 upon movement of the selector plate 30 towards the master plate 27 and thus center the desired apertures in the selector plate 30 with the desired apertures in the master plate 27.

A stop 78 is provided to limit downward movement of the centering portion 77 about its axis of pivotal connection with the member 75 and prevent fouling of said centering portion with the selector plate 30 when said centering portion is disengaged therefrom and said selector plate is being moved into engagement with the master plate 27.

The centering dog 33 is provided with an equalizing portion 79 which extends forwardly therefrom and has its forward end disposed above and rearwardly of the centering portion 77 of said centering dog. The underside of the equalizing portion 79 of the centering dog 33 is inclined downwardly towards the rearward end thereof and is shaped in the form of the letter W equal in width to the space between any two teeth 32. The forward end of the underside of the equalizing portion 79 of the centering dog 33 is spaced above the teeth 32 so said forward end may loosely engage the space between the teeth 32 and, as has been before stated, the underside of said equalizing portion is inclined rearwardly and downwardly so that its rearward end may snugly engage the space between any two teeth 32. The V of the W on the underside of the equalizing portion 79 is arranged so as to loosely engage the tops of any tooth 32 adjacent its forward end and snugly engage any tooth 32 adjacent its rearward end.

A leaf spring 81 is secured to a member 83 extending upwardly from the member 75 and has bearing engagement with the upper side of the centering portion 77 of the centering dog 33. The leaf spring 81 holds the centering portion 77 in engagement with either a space between any two teeth 32 or with the top of tooth 32 and permits a certain amount of pivotal movement of the centering dog 33 about its axis of pivotal connection with the member 75.

The function of the equalizing portion 79 is to take care of cases where a tooth 32 is apt to hit the forward portion of the centering portion 77. For example, when the selector plate 30 is being moved towards the master plate 27 there is apt to be a tendency for the point of one of the teeth 32 to engage one of the forwardly projecting points of the centering portion 77 of the centering dog 33 and fail to bring said tooth into proper alignment. When this occurs, the centering portion 77 will lift against the spring 81 and the centering dog 33 will tend to rotate about its axis of pivotal connection to the member 75. Thus as the equalizing portion engages a tooth 32 it will impart a slight rotating movement to the selector plate 30 and allow the top portion of the tooth 32 to clear the points of the centering portion 77. When this happens the centering portion 77 will be moved downwardly by the leaf spring 81 and will again properly engage the space between any two teeth 32 or the top of any tooth 32 and align the apertures 34, 35, and 36 with the apertures 37, 38, and 39, respectively, and eliminate the dead center action between said teeth and centering dog.

Referring now in particular to the method of operating the recording and totaling device 14 by means of the respective bellows 42, 43 and 53, as is diagrammatically illustrated in Figures 1 and 6, said bellows are supported in a casing 84 in a suitable manner, not herein shown or described since it is no part of my invention. While any form of bellows may be used, the bellows herein preferably shown is a double bellows having fixed outer sides 85, a movable center 86, and springs 87 connected between the inner side of each fixed outer side 85 and the movable center 86 for holding said movable center in a central position with respect to the outer sides 85 when no suction is exerted on opposite sides of the bellows.

A tube 88 leads from the lower side of each bellows and another tube 89 leads from the upper side of each bellows. These tubes in turn lead to a suitable manifold 90, which manifold in turn is connected to a suction device diagrammatically indicated at 91. The suction device 91 is preferably driven by an electric motor diagrammatically indicated at 92. When the suction device 91 is in operation, suction is created on both sides of the movable center 86 of each bellows. If for any reason suction is released from one side or the other of any bellows the movable center 86 of said bellows will move towards the opposite side of said bellows through suction created in the respective side of said bellows.

As has been before stated, a flexible tube 41 leads from each hundreds aperture to each hundreds bellows and a similar flexible tube leads from each set of units and tens apertures to each corresponding units and tens bellows. It may thus be seen that when the apertures in the master plate 27, from which each respective flexible tube leads, are closed by the selector plate 30 the center 86 of each bellows will remain in a central position with respect to each bellows and that when any of said apertures are opened said movable center will be moved away from the open side by means of suction in the opposite side of each bellows.

Each bellows has an arm 93 connected to its movable center 86 adjacent the outer side thereof. These arms are of varying lengths depending upon the distance of the respective bellows from its respective key on the recording and totaling device 14 and each arm 93 depends from a movable center 86 and has engagement with a key on said recording and totaling device. The flexible tubes leading from the selector unit 13 are connected to the top side 85 of each bellows. It may therefore be seen that when the suction device 91 is in operation and suction is released from any of the bellows 42, 43 or 53 by the opening of an aperture connected to said bellows that the center 86 of said bellows will move downwardly which will in turn move the arm 93 downwardly and depress a key on the recording and totaling device 14.

The device of my invention is so arranged that the suction device 91 is only in operation when the selector plate 30 and annular ring 31 engages the master plate 27. As is shown diagrammatically in Figure 1, a two-way switch 94 is connected with the link 65 of the mechanism for shifting the selector plate 30 along the dial shaft 11. As the hand lever 64 is moved in a direction to engage the selector plate 30 and annular ring 31 with the master plate 27, the switch 94 will close contacts between conductors 96 and 97 which will close the circuit to the motor 92 to start said motor and operate the suction device 91.

The connection between the switch 94 and the link 65 is such that the circuit to the motor 92 will not be closed until the annular ring 31 engages the master plate 27 and closes the desired apertures. In order to so time the closing of the circuit to the motor 92, the compression spring 70 is so arranged that after the selector plate 30 is engaged with the master plate 27 by said compression spring it is necessary to move the hand lever 64 a further distance and compress said spring a further amount to close the circuit between the conductors 96 and 97.

Means are provided to release suction in the manifold 90 after completion of the recording operation and before the selector plate 30 is disengaged from the master plate 27 to prevent any of the keys on the recording and totaling device from being depressed upon disengagement of said selector plate from said master plate. Said means is herein diagrammatically shown as being a valve 98 preferably connected with a line 99 leading from the suction device 91 and manifold 90 so that opening of said valve will release suction from the entire fluid pressure system.

The valve 98 may be operated in any suitable manner but is herein preferably shown as being operated by the hand lever 64 upon movement of said hand lever in a direction to disengage the selector plate 30 from the master plate 27 but before disengagement of said selector and master plates. In the form shown a connecting link 101 is provided to connect the hand lever 64 with an upstanding operating handle 100 for the relief valve 98.

It may be seen that due to the provision of the slot 62 in the link 65, as has before been mentioned, when the hand lever 64 is moved in a direction to disengage the selector plate 30 from the master plate 27 that the valve 98 will be opened by means of the link 100 before said selector and master plates are disengaged. Opening of the valve 98 will release suction in the fluid pressure system which will prevent the keys on the recording and totaling device from being operated by their respective bellows upon disengagement of the selector plate 30 from the master plate 27.

At the same time the hand lever 64 is moved in a direction to disengage the selector plate 30 from the master plate 27, the compression spring 70 will move the collar 59 with respect to the dial shaft 11. This will simultaneously pivotally move the lever 61 and link 65 along the slot 62 and will open the circuit between the conductors 96 and 97 and stop the motor 92 and suction device 91.

As the hand lever 64 is moved further in the same direction the selector plate 30 will be disengaged from the master plate 27 and the switch 94 will close the contacts between conductors 102 and 103 and close a circuit leading to the recording and totaling device 14. This circuit is provided to start a motor (not shown) in said recording and totaling device for operating said recording and totaling device in a usual manner. The hand lever 64 is then returned to a neutral position disengaging the collar 59 from the collar 71 so that the notched spring member 74 may engage the respective shifting lever 61.

Referring now in particular to the use and operation of the device of my invention, the article to be weighed is placed on the platform of the scale 10. When the scale dial has come to rest indicating the correct weight of the article, the selector plate 30 is moved towards the master plate 27 by the hand lever 64 and the annular ring 31 is engaged with said master plate. Simultaneously the dog 33 engages one of the teeth 32 or the space between any two of said teeth to prevent rotary movement of the selector plate 30 and align the apertures in said selector plate with the proper apertures in the master plate 27. For example, consider the article on the scale 10 to weigh two hundred pounds, the arcuate shaped slot 36 will uncover the "two hundred" hundreds aperture 37, the aperture 35 will uncover the corresponding "zero" tens aperture 38 and the aperture 34 will uncover the corresponding "zero" units aperture 39. Thus all apertures except the apertures registering "two hundred" will be closed. The handle 64 is then moved further in the same direction against the compression spring 70 to close the circuit between the conductors 96 and 97 and start the motor 92. This will create a suction in the lower half of all of the bellows and a similar suction in the upper half of all the bellows except those connected to the "two hundred" apertures in the selector unit 13. Accordingly the center pieces 86 of the bellows connected with the apertures in the selector unit 13 corresponding to "two hundred" will be moved downwardly. This will move the arms 93 downwardly which will depress the respective keys on the recording and totaling device 14. When this operation has been completed, the hand lever 64 is moved in an opposite direction to first open the relief valve 98 in a manner which has hereinbefore been described and then disengage the annular ring 31 from the master plate 27. When the selector plate 30 and annular ring 31 are disengaged from the master plate 27 the hand lever 64 is moved further in the same direction to close the circuit between the conductors 102 and 103 by means of the switch 94 and start the motor in the recording and totaling device 14 in a usual manner and cause the weight "two hundred" to be recorded. The hand lever 64 is then returned to a neutral position and the notched spring member 74 engaged with its respective shifting lever 61 for holding the collar 59 in a disengaged position from the collar 71 to prevent friction between said collars as the selector plate 30 is turned by the dial shaft 1 during the next weighing operation. In a similar manner the weighing operation may be continued and the weights measured may be totaled by the recording and totaling device 14.

While I have herein shown and described one embodiment of my invention, it will be understood that the arrangement and construction of the various parts may be changed or altered without departing from the spirit and scope thereof. Furthermore, I do not wish to be construed as limiting myself to the specific form illustrated, excepting as it may be limited in the appended claims.

I claim as my invention:

1. In an apparatus of the class described, a measuring device, and selective register operating means comprising an apertured member, and a rotatable apertured member operatively connected with said measuring device and engageable with said first mentioned apertured member.

2. In an apparatus of the class described, a measuring device, and fluid pressure selective register operating means comprising an apertured member, and another apertured member operatively connected with said measuring device and engageable with said first mentioned apertured member.

3. In an apparatus of the class described, a measuring device, a shaft rotatable upon the measuring operation of said measuring device, and selective register operating means comprising an apertured member supported independently of said shaft and a rotatable member operatively connected with and arranged concentrically of said shaft for engagement with said apertured member for closing certain apertures in said apertured member and allowing certain other apertures to remain open for performing the registering operation.

4. In an apparatus of the class described, a measuring device, a shaft rotatable upon the measuring operation of said measuring device, and selective fluid pressure register operating means comprising an apertured member supported independently of said shaft and another member operatively connected with said shaft and engageable with said apertured member for closing certain apertures in said apertured member and allowing certain other apertures to remain open for performing the registering operation.

5. In combination with a measuring device, a register remote from said measuring device, suction means for operating said register, and means connectible with said measuring device for selectively operating said suction means for operating said register upon the measuring operation of said measuring device comprising an apertured member, and another member operatively connected with said measuring device, said member being engageable with said apertured member for closing certain apertures in said apertured member and allowing certain other apertures to remain open.

6. In combination with a measuring device, a register remote from said measuring device, suction means for operating said register, and means connectible with said measuring device for selectively operating said suction means for operating said register upon the measuring operation of said measuring device comprising an apertured member, means for connecting the apertures in said apertured member with said suction means, and another member operatively connected with said measuring device, said member being engageable with said apertured member for closing certain apertures in said apertured member and allowing certain other of said apertures to remain open for selectively operating said suction means.

7. In combination with a measuring device having a dial shaft, a register remote from said measuring device, suction means for operating said register, means connectible with said dial shaft for selectively operating said suction means for operating said register upon the measuring operation of said measuring device comprising an apertured member supported independently of said dial shaft, another member operatively connected with said dial shaft, said member being engageable with said apertured member for closing certain apertures in said apertured member and allowing certain other apertures to remain open for selectively operating said suction means, and means supported independently of said dial shaft and said second mentioned member for engaging said second mentioned member with said apertured member.

8. In combination with a measuring device, a register remote from said measuring device, suction means for operating said rgeister, and means connectible with said measuring device for selectively operating said suction means for operating said register upon the measuring operation of said measuring device comprising a member having a plurality of apertures spaced on the face thereof and forming a plurality of passageways therethrough, certain of said apertures being adapted to represent certain units and certain other of said apertures being adapted to represent certain other units, another member adapted to abut the face of said first mentioned member and having a plurality of apertures extending therethrough and adapted to register with the apertures in said first mentioned member and means for connecting certain of said apertures representing like units together comprising a channel in said last mentioned member having connection with each of said apertures representing like units.

9. In combination with a measuring device, a register remote from said measuring device, suction means for operating said register, and means connectible with said measuring device for selectively operating said suction means for operating said register upon the measuring operation of said measuring device comprising a plate having a plurality of spaced apertures concentrically arranged on the face thereof and forming a plurality of passageways therethrough, certain of said apertures being adapted to represent certain units and certain other of said apertures being adapted to represent certain other units, a plurality of plates having a plurality of spaced apertures concentrically arranged on the face thereof and forming a plurality of passageways therethrough, said last mentioned plates being arranged so as to abut each other and so as to abut said first mentioned plate so that certain of said apertures may register with certain other of said apertures and form passageways therethrough and means for connecting certain of said apertures representing like units together comprising a circular channel in each of said last mentioned plates, each of said channels being adapted to have connection with a set of apertures representing like units.

10. In an apparatus of the class described, a measuring device, a shaft rotatable upon measuring operation of said measuring device, register operating means comprising a plurality of bellows operative on release of suction therein, and a selector unit for selectively operating said register operating means comprising an apertured member supported independently of said shaft, means for connecting certain apertures in said apertured member with certain of said bellows, and another member operatively connected with said shaft and engageable with said first mentioned apertured member for closing certain apertures in said first mentioned apertured member and allowing certain other apertures to remain open to release suction in certain of said bellows for performing the registering operation.

11. In an apparatus of the class described, a measuring device, a shaft rotatable upon measuring operation of said measuring device, register operating means comprising a plurality of bellows operative on release of suction therein, and a selector unit for selectively operating said register operating means comprising an apertured member supported independently of said shaft, means for connecting certain apertures in said apertured member with certain of said bellows, and another member supported on said shaft for slidable movement therealong and for rotatable movement with said shaft upon rotation of said shaft for engaging said first mentioned apertured member and closing certain apertures therein and allowing certain other apertures to remain open to release suction in certain of said bellows for performing the registering operation.

12. In an apparatus of the class described, a measuring device, a shaft rotatable upon measuring operation of said measuring device, register operating means comprising a plurality of bellows operative on release of suction therein, means for effecting suction in said bellows, a selector unit for selectively operating said register operating means comprising an apertured member supported independently of said shaft, means for connecting said apertures in said apertured member with certain of said bellows, another member operatively connected with said shaft and engageable with said first mentioned apertured member for closing certain apertures therein, and means operative upon engagement of said first mentioned apertured member by said second mentioned apertured member for actuating said means for effecting suction in said bellows.

13. In an apparatus of the class described, a scale having a dial shaft, and suction register operating means comprising a master plate supported independently of said scale dial shaft and having a plurality of apertures therein, a selector plate operatively connected with said dial shaft for movement therewith and for movement with respect thereto for engagement with said master plate, said selector plate having a plurality of apertures therein adapted to register with certain apertures in said master plate for allowing certain apertures in said master plate to remain open while certain other of said apertures are closed by said selector plate.

14. In an apparatus of the class described, a scale having a dial shaft and suction register operating means comprising a master plate supported independently of said scale dial shaft and having a plurality of concentrically arranged apertures therein corresponding with characters adapted to be indicated by a dial on said scale, a selector plate arranged concentrically with said dial shaft for movement therewith, and for movement with respect thereto for engagement with said master plate, said selector plate having a plurality of apertures therein adapted to register with certain apertures in said master plate for allowing certain apertures in said master plate to remain open while certain other of said apertures are closed by said selector plate.

15. In an apparatus of the class described, a measuring device, and means for selectively operating register means remote from said measuring device by power derived from sources other than said measuring device upon measuring operation of said measuring device comprising an apertured member having operative connection with said means for selectively operating said register means, and another apertured member operatively connected with said measuring device and engageable with said first mentioned apertured member upon measuring operation of said measuring device for causing actuation of said means for selectively operating said register means.

16. In combination with a scale, a dial shaft, register means, and suction means connectible with said scale for operating said register means and recording the weights measured comprising an apertured member supported independently of said dial shaft, another member operatively connected with said dial shaft for movement therewith and for movement with respect thereto for engagement with said first mentioned apertured member for closing certain apertures in said apertured member and allowing certain other apertures to remain open during the weighing operation of said scale, and means for aligning said second mentioned member with said apertured member during engaging movement of said second mentioned member with respect to said dial shaft.

17. In combination with a scale, a dial shaft, register means, and suction means connectible with said scale for operating said register means and recording the weights measured comprising an apertured member supported independently of said dial shaft, another member operatively connected with said dial shaft for movement therewith and for movement with respect thereto for engagement with said first mentioned apertured member for closing certain apertures in said apertured member and allowing certain other apertures to remain open during the weighing operation of said scale, and means for aligning said second mentioned member with said apertured member during engaging movement of said second mentioned member with respect to said dial shaft comprising a centering dog yieldably supported on said first mentioned apertured member for limited pivotal movement with respect thereto having forwardly extending engaging means engageable with the outer periphery of said second mentioned member.

18. In combination with a scale, a dial shaft, register means, and suction means connectible with said scale for operating said register means and recording the weights measured comprising a master plate supported independently of but concentric with said dial shaft and having a plurality of concentrically arranged spaced apertures therein, a selector plate arranged concentrically with said dial shaft and operatively connected with said dial shaft for rotatable movement therewith and for movement with respect thereto for engagement with said master plate, said selector plate having a plurality concentrically arranged apertures therein adapted to register with certain apertures in said master plate for allowing certain apertures in said master plate to remain open while certain apertures in said master plate are closed, means supported independently of said dial shaft and said selector plate for engaging said selector plate with said master plate, and means for aligning said selector plate with said master plate during engaging movement of said selector plate with respect to said dial shaft.

19. In combination with a scale, a dial shaft, register means, and suction means connectible with said scale for operating said register means and recording the weights measured comprising a master plate supported independently of but concentric with said dial shaft and having a plurality of concentrically arranged spaced apertures therein, a selector plate arranged concentrically with said dial shaft and operatively connected with said dial shaft for rotatable movement therewith and for movement with respect thereto for engagement with said master plate, said selector plate having a plurality of concentrically arranged apertures therein adapted to register with certain apertures in said master plate for allowing certain apertures in said master plate to remain open while certain apertures in said master plate are closed, means supported independently of said dial shaft and said selector plate for engaging said selector plate with said master plate, and means for aligning said selector plate with said master plate during engaging movement of said selector plate with respect to said dial shaft comprising a centering dog yieldably supported on said master plate for limited pivotal movement with respect thereto having an engaging portion spaced from its axis of pivotal movement and having an equalizing portion spaced closer to the axis of pivotal movement of said centering dog than said engaging portion, said equalizing portion being adapted to engage the outer periphery of said selector plate for pivotally moving said centering dog and selector plate and eliminating any dead center action between said engaging portion and said selector plate.

20. In an apparatus of the class described, a measuring device comprising a scale having a dial shaft, a register, and means for actuating said register for recording the weights measured by said scale comprising an apertured member supported independently of said dial shaft, another apertured member supported independently of but operatively connected with said dial shaft for movement therewith and for movement with respect thereto for engagement with said first-mentioned apertured member for closing certain apertures in said apertured member and allowing certain other apertures to remain open corresponding to the weight measured, means for aligning said second-mentioned member with said first-mentioned member during engagement of said second-mentioned member with said first-mentioned member and means supported independently of said dial shaft and said second-mentioned member for engaging said second-mentioned member with said first-mentioned member.

GEORGE V. TURNBULL.